UNITED STATES PATENT OFFICE.

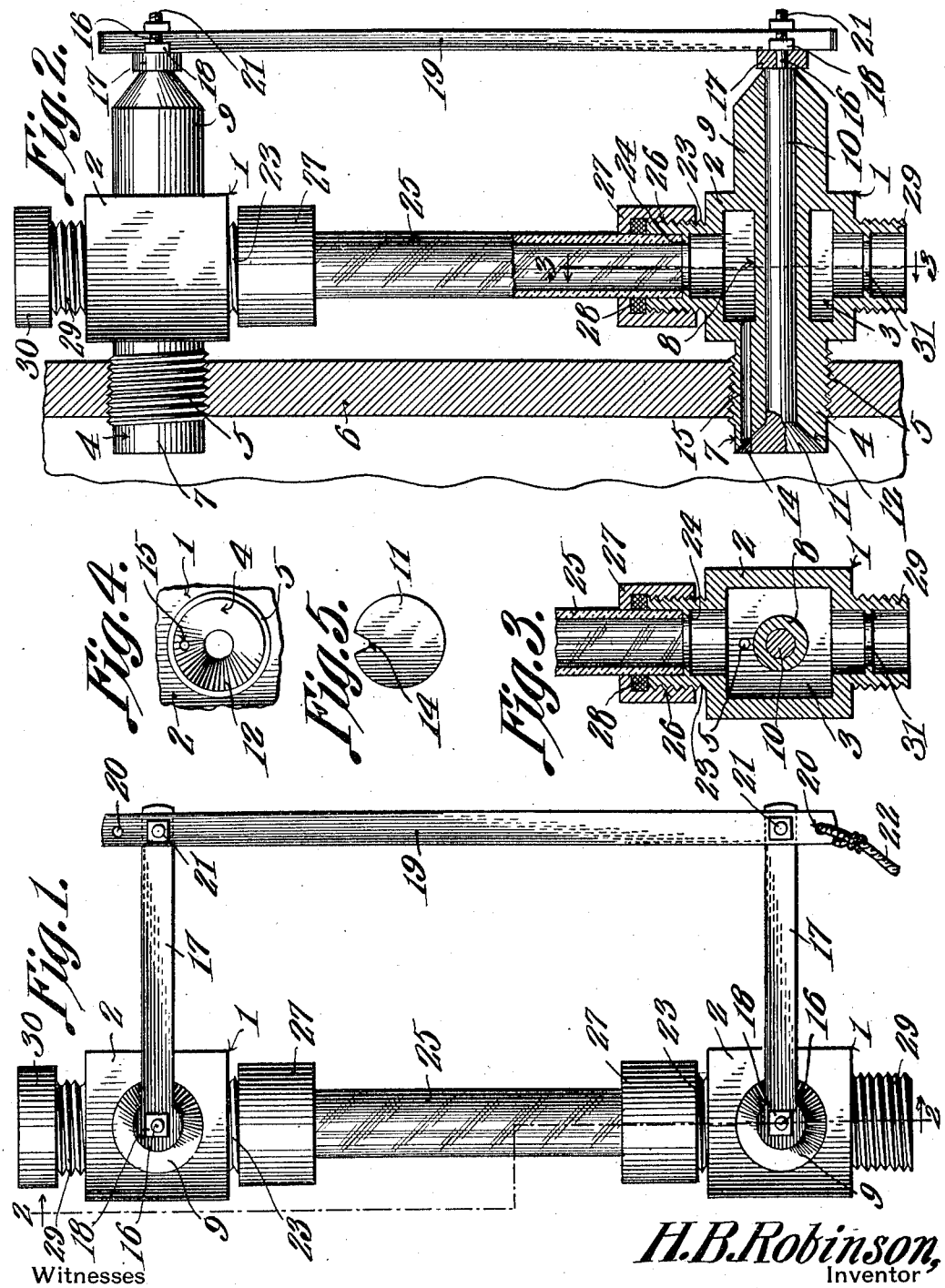

HARRY B. ROBINSON, OF MUSKEGON, MICHIGAN.

WATER-GLASS FIXTURE FOR STEAM-BOILERS.

1,020,623.  Specification of Letters Patent.  Patented Mar. 19, 1912.

Application filed October 25, 1911. Serial No. 656,657.

*To all whom it may concern:*

Be it known that I, HARRY B. ROBINSON, a citizen of the United States, residing at Muskegon, in the county of Muskegon and State of Michigan, have invented a new and useful Water-Glass Fixture for Steam-Boilers, of which the following is a specification.

The present invention aims to provide a novel form of holder for a gage glass, the holder being adapted to receive a valve, whereby the supply to the gage glass may be controlled, in case of accident to the gage glass.

A further object of the invention is to provide novel means for assembling the gage glass with the holder, and to provide valve mechanism of novel and improved form for controlling the supply to the gage glass.

A further object of the invention is to provide novel means for operatively connecting the valves of a pair of gage glass holders, whereby the valves may be set to cut off both ends of the gage glass simultaneously.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed, without departing from the spirit of the invention.

In the accompanying drawings,—Figure 1 shows the invention in front elevation; Fig. 2 is a section upon the line 2—2 of Fig. 1; Fig. 3 is a section upon the line 3—3 of Fig. 2; Fig. 4 is a fragmental rear elevation of a portion of the boiler shell, showing the nipple portion of the device mounted therein; and Fig. 5 is an elevation of the head of the valve.

In carrying out the invention there are provided a pair of holders, denoted generally by the numeral 1. These holders are identical in construction, and but one of them will be described.

The holder comprises a body 2, preferably although not necessarily, rectangular, the body 2 being provided with a central chamber 3. Projecting from one side of the body 2 is a boiler-engaging nipple 4, the nipple 4 being threaded, intermediate its ends, as shown at 5, to engage with the boiler shell 6, the boiler-inclosed end 7 of the nipple 4, however, being devoid of threading, for a purpose which will be set forth hereinafter.

Formed integrally with the body 2, and extended across the chamber 3, is a tubular bearing 8, alined with an outstanding, external bearing 9. In the boiler-engaging nipple 7, in the bearing 8 and in the bearing 9, is journaled for rotation, a valve, comprising a stem 10, carrying at its inner end, a conical head 11, registering in a conical seat 12, formed in the end face of the portion 7 of the boiler-engaging nipple 4. The stem 10 not only rotates in the nipple 4, in the bearing 8 and in the bearing 9, but, as well, is mounted for longitudinal sliding movement therein. Owing to this fact, the pressure of the steam within the boiler will maintain the conical head 11 in the seat 12, there being no threads upon the stem 10. There is an opening 14 in the head 11, which opening is adapted to be alined, when the valve is rotated, with a passage 15, extended longitudinally through the nipple 4, the passage 15 communicating with the chamber 3.

That end of the stem 10 which protrudes beyond the outer end of the external bearing 9 is reduced, as shown at 16, to receive a transverse member, preferably taking the form of a lever 17, there being a nut 18 upon the end 16, to maintain the lever in place. Recalling that there are two of the levers 17, it is to be observed that these levers are united by a connecting bar 19. The bar 19 is equipped, adjacent its ends, with a plurality of openings 20 in which bolt and nut structures 21 may be mounted, for the purpose of connecting the bar 19 with the free ends of the levers 17. By mounting the bolt and nut structures 21 successively in the openings 20, the valves may be set in such a manner that when the valves are operated simultaneously, the openings 14, in the valve heads 11 will register simultaneously with the passages 15 in the nipples 4. The steam and water supply to the chambers 3 will, therefore, be cut off simultaneously. In one of the openings 20 an operating member 22, preferably taking the form of a cord, may be inserted.

The holders 1 are equipped with means for receiving the gage glass. This means includes a socket 23, outstanding from the body 2, there being in the interior of the socket 23, a shoulder 24, adapted to receive the end of the lower end of the gage glass 25. The sockets 24 are threaded as shown at 26 to receive a cap nut 27, surrounding the gage glass 25, a packing 28 being inserted between the cap nut 27 and the end of the socket 23. The upper end of the gage glass 25 is engaged by the upper nut 27 only, and does not enter the upper socket 23. In practice, the lower end of the glass 25 will fit loosely enough in the lower socket 23 so that the upper end of the glass may be moved into alinement with the upper socket 23, whereupon the upper nut 27 may be applied. Communicating with the chamber 2 and projecting from the body 1 in axial alinement with the socket 23 is a drainage tube 29, threaded, as shown. It will be understood that in practice, the drainage tube 29 is normally closed by a valve or the like, not shown. The drainage tube 29 of the upper holder 1 may be closed in any desired manner, as by a screw cap 30. If desired, the tube 29 may be provided with a shoulder 31, similar to the shoulder 24 of the socket 23. Owing to this fact and to the further fact that a tube 29 is provided for the upper holder, but one set of castings is necessary, both holders being duplicates. Either the tube 29 or the socket 23 may be placed uppermost and the gage glass 29, the cap 27 and the cap 30 may be interchangeably mounted upon the parts 29 and 23. It is not necessary to carry in stock, two separate forms of holders, one form being adapted to receive either the upper or the lower end of the gage glass.

In practical operation, the drainage tube 29 being closed, the steam and water will enter the alined openings 14 and 15 in the valve and in the nipple, respectively, the steam and water passing thence into the chambers 3, and from the chambers into the gage glass 25. Should the gage glass burst, the cord 22 may be drawn upon, operating the bar 19 and tilting the levers 17 simultaneously, thereby rotating the valves and moving the openings 14 and 15 out of coincidence, whereupon the steam and water supply will be shut off. The cord 22 may be of any desired length, so that this operation may be carried out at considerable distance from the boiler.

It frequently happens that, in inserting the gage tube holders into the boiler wall, the nipple portions of the holders are bent out of shape at their inner ends, during the threading of the nipples into the boiler wall. This undesirable condition is avoided in the present instance, by reason of the fact that the ends 7 of the nipples 4 are devoid of threads. It is therefore impossible to distort the ends 7, during the threading of the nipples 4 into the boiler shell 6.

There are no threads upon the valve stem 10, and consequently the valve may be depended upon to act quickly, in case of accident, all chance of a failure of proper coöperation between threaded parts being avoided.

Having thus described the invention, what is claimed is:—

1. A gage tube holder comprising a body having a chamber, there being a boiler-engaging nipple upon one side of the body, and a tubular bearing within the body and extended across the chamber, the body having a tube-receiving opening, communicating with the chamber; the valve including a stem rotatably mounted in the bearing and in the nipple, and a head upon the stem, journaled in the end of the nipple, there being an opening through the nipple into the chamber, and an opening through the head, adapted to be alined with the opening in the nipple; and means for operating the valve.

2. A gage tube holder comprising a body having a chamber, there being a boiler-engaging nipple upon one side of the body, and a tubular bearing within the body and extended across the chamber; a valve rotatable in the bearing and in the nipple, to cut off the supply to the chamber, the nipple being smooth at its boiler-inclosed end, and being threaded inwardly from said end; and means for securing a gage tube to the body.

3. A gage tube holder comprising a body having a chamber, there being boiler-engaging means upon one side of the body, and a tubular bearing within the body and extended across the chamber; a valve rotatable in the bearing and adapted to cut off the supply to the chamber; the body having a projecting socket, communicating with the chamber, the socket being equipped with an inwardly projecting shoulder, adapted to receive one end of a gage tube; a cap nut threaded upon the socket; and a packing interposed between the cap nut and the socket.

4. A gage tube holder comprising a body having a chamber, there being a drainage tube and a gage glass socket projecting from opposite sides of the body and communicating with the chamber, the body having a boiler-engaging nipple, and a bearing projecting in alinement with the nipple, and disposed at right angles to the socket and to the drainage tube, the bearing being extended across the interior of the chamber;

a valve including a stem journaled in the bearing and in the nipple, and a head carried by the stem and rotatable in the boiler-inclosed end of the nipple, there being an opening through the nipple, communicating with the chamber, and an opening in the head, adapted to be alined with the opening through the nipple.

In testimony that I claim the foregoing as my own, I have hereto affixed my signature in the presence of two witnesses.

HARRY B. ROBINSON.

Witnesses:
P. C. NORTHOUSE,
J. A. JOHNSON.